No. 710,728. Patented Oct. 7, 1902.
W. O. WORTH.
VALVE AND VALVE MECHANISM FOR GAS ENGINES.
(Application filed May 28, 1900.)

(No Model.) 3 Sheets—Sheet 1.

Witnesses
Inventor:
William O. Worth
By Jones Payn
Attorney.

No. 710,728. Patented Oct. 7, 1902.
W. O. WORTH.
VALVE AND VALVE MECHANISM FOR GAS ENGINES.
(Application filed May 28, 1900.)
(No Model.) 3 Sheets—Sheet 2.
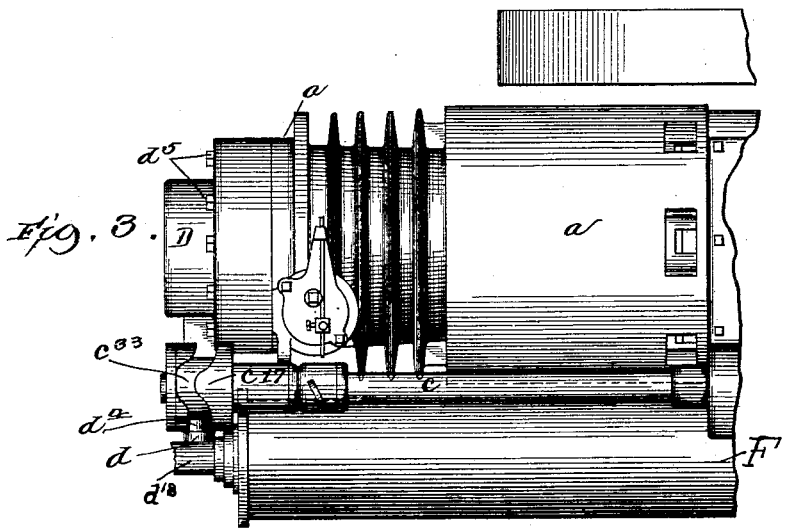
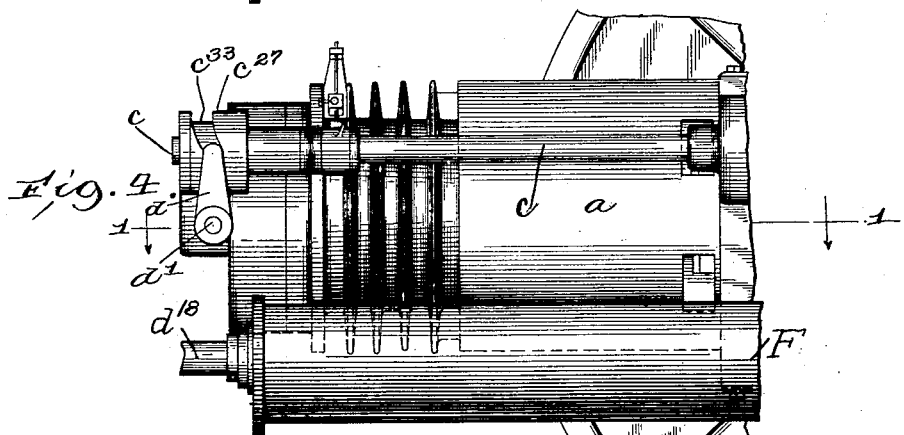
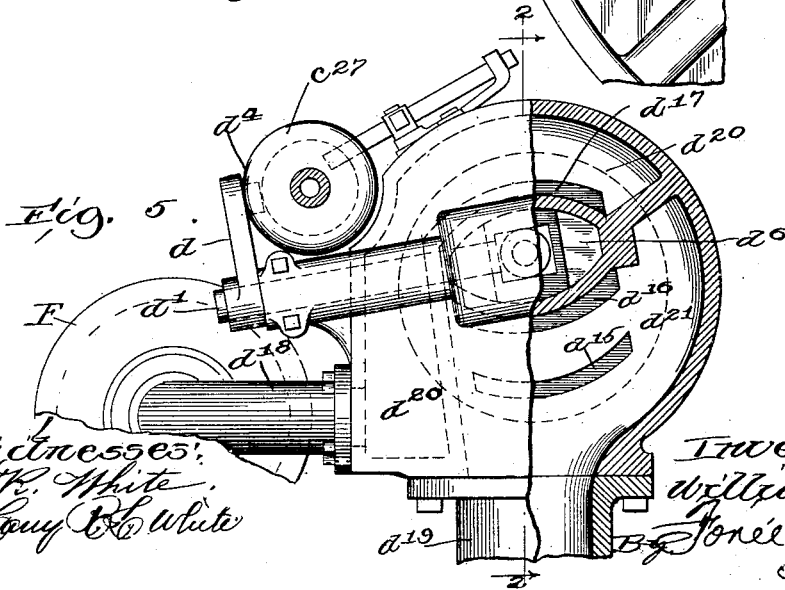

No. 710,728. Patented Oct. 7, 1902.
W. O. WORTH.
VALVE AND VALVE MECHANISM FOR GAS ENGINES.
(Application filed May 28, 1900.)
(No Model.) 3 Sheets—Sheet 3.
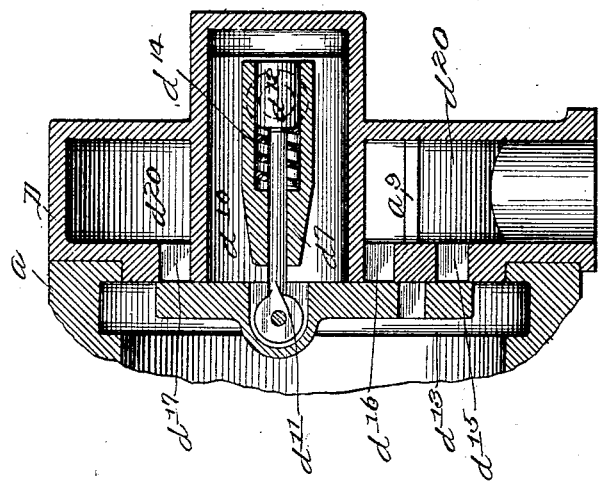
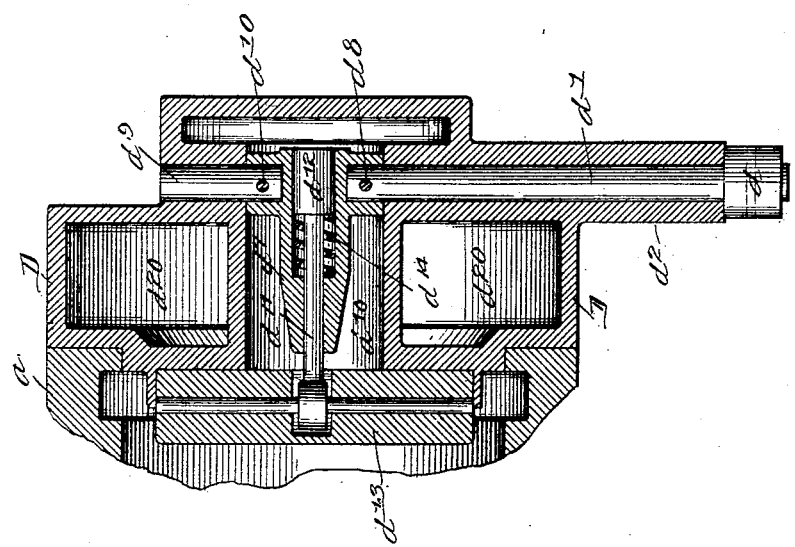

UNITED STATES PATENT OFFICE.

WILLIAM O. WORTH, OF CHICAGO, ILLINOIS.

VALVE AND VALVE MECHANISM FOR GAS-ENGINES.

SPECIFICATION forming part of Letters Patent No. 710,728, dated October 7, 1902.

Original application filed September 9, 1899, Serial No. 729,910. Divided and this application filed May 28, 1900. Serial No. 18,268. (No model.)

*To all whom it may concern:*

Be it known that I, WILLIAM O. WORTH, a citizen of the United States, residing at Chicago, county of Cook, and State of Illinois, have invented certain new and useful Improvements in Valves and Valve Mechanism for Gas-Engines; and I do hereby declare the following to be a full, clear, and exact description, such as will enable persons skilled in the art to which it appertains to make and use the same.

My present application is a division of my original application, Serial No. 729,910, filed September 9, A. D. 1899.

My present invention relates to improvements in the construction, application of, use of, and mechanism for operating a valve for a gas-engine.

In gas-engines constructed with puppet or rotary valves the former are objectionable, for the reason that there are frequently deposits of the burned products that form on the seat of such valves, in the event of which they become defective in not closing tightly. As there is no way to remove such deposits without taking the engine apart, the deposit accumulates until the engine becomes inoperative. The latter class of valves require considerable lubrication as a result of their constant motion and being subject to the intense heat of the explosion. For these reasons there is always some trouble experienced in properly supplying them with a sufficient quantity of lubricating-oil.

The object of my present invention is to overcome these difficulties by producing a valve that has all of the desirable features of the valve of the class referred to without any of the objections.

Figure 1:
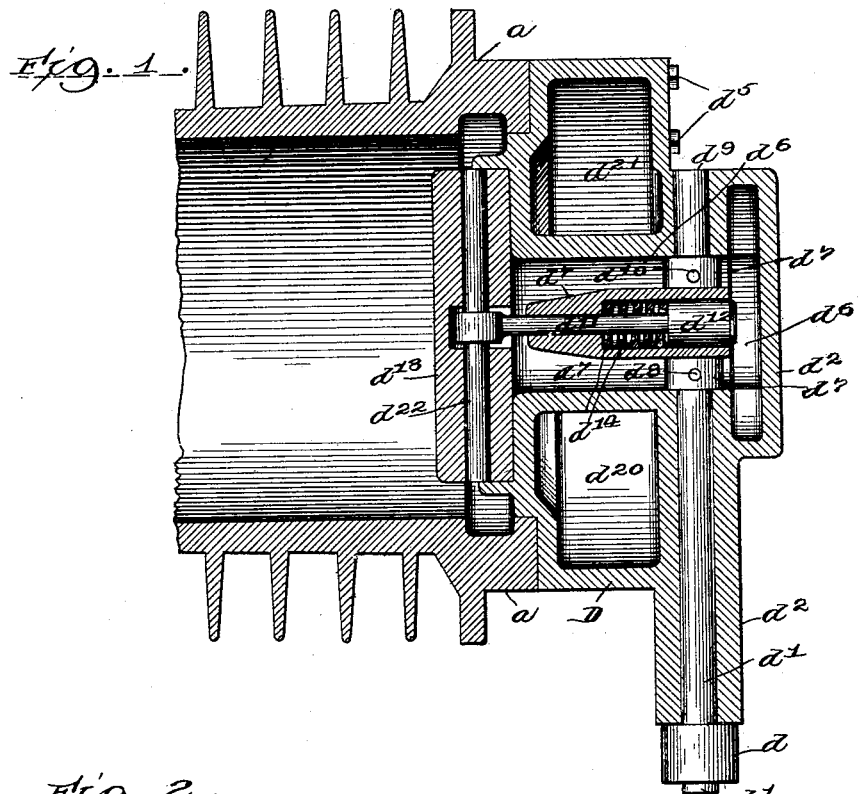
Figure 2:
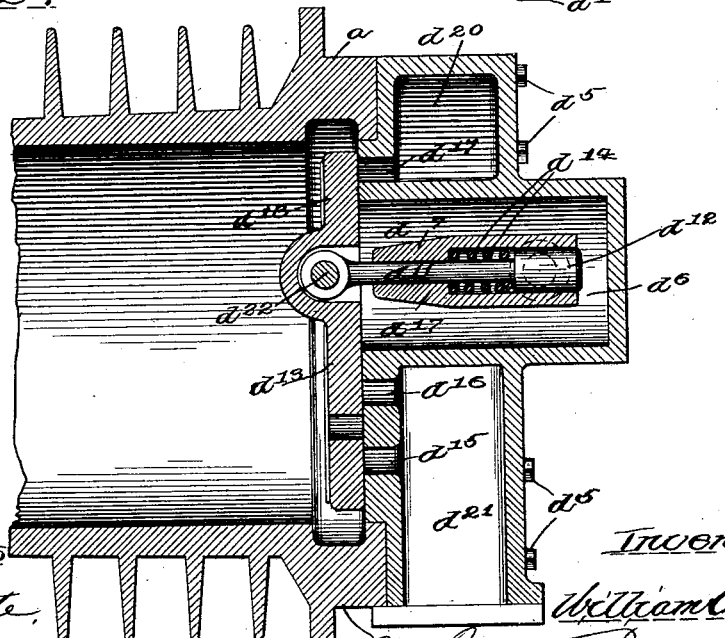

In the drawings, Figure 1 is a fragmentary portion of a gas-engine in section, taken on lines 1 1 of Fig. 4. Fig. 2 is a section of same taken on a line at a right angle to that of Fig. 1 shown as line 2 2 of Fig. 5. Fig. 3 is a fragmentary view of the outside of the engine from above, showing the valve mechanism. Fig. 4 is a similar view from the side of an engine, showing the same mechanism. Fig. 5 is an end view of the engine, a part of the cylinder-head broken away, showing the ports for the entrance of the gases and for the exit of the burned products of combustion. Fig. 6 is a vertical section taken through the cylinder and valve mechanism. Fig. 7 is a longitudinal section of the same.

The same letters of reference are used to indicate similar parts in all of the views.

The body of the engine is indicated by $a$. A shaft $c$ is revolved by a suitable gearing connected with the main shaft.

D is the cylinder-head of the engine. It is hollow and contains a passage-way $d^{20}$ for the inflowing gases and in which the gases will become heated before entering the cylinder through the port $d^{17}$. The fuel-supply receiver F is connected by the pipe $d^{18}$. The cylinder-head also contains another passage-way $d^{21}$, which is connected to the exhaust-pipe $d^{19}$. Two ports $d^{15}$ and $d^{16}$ are cut through the walls of the cylinder-head into the cylinder. Another separate chamber $d^6$ is also contained in the cylinder-head. The mechanism for operating the valve $d^{13}$ is located in this chamber. The chamber $d^6$ is also designed to contain a lubricating liquid for lubricating the working parts contained therein and also for lubricating the face of the valve $d^{13}$ and its seat. The chamber may contain water instead of oil for keeping the ports and the valve $d^{13}$ cool, or it may contain a mixture of oil and water.

The rod or shaft $d'$ has a long air-tight but free bearing within the cylinder-head extension $d^2$. A stuffing-box around the shaft $d'$ may be provided at the end of this extension, if desirable. The shaft $d'$ passes through the chamber $d^6$ within the cylinder-head extension $d^2$ and is fixed to a T-shaped hollow casting $d^7$ by a pin $d^8$. Another short shaft $d^9$ is coaxially arranged with reference to the shaft $d'$, and it is also fixed in the casting $d^7$ by means of a pin $d^{10}$. A pin $d^{11}$, having an enlarged end $d^{12}$, passes through the casting $d^7$ and is pivotally fixed to the valve $d^{13}$ by means of the pin $d^{22}$. The pin $d^{11}$ is elastically held against lateral movement by means of the open spiral spring $d^{14}$, which is placed between the abutment formed in the casting $d^7$ and the head $d^{12}$ of the pin $d^{11}$, by means of which the valve $d^{13}$ is held with some force against its seat provided upon the cylinder-head within the cylinder. The oscillation of the shaft $d'$ causes the valve $d^{13}$ to be vibrated across the inside face of the cylinder-head and over the exhaust-ports $d^{15}$ $d^{16}$ and the inlet-port $d^{17}$, opening and closing them alternately.

The arm $d$ is fixed to the shaft $d'$ and is provided with a roller $d^4$ upon its end. The said roller extends laterally into a groove $c^{33}$ of the cam $c^{27}$, which is mounted upon the shaft $c$. The roller trailing in the groove $c^{33}$ as the cam is revolved in virtue of the sinuosity of the groove $c^{33}$ imparts to the arm $d$, which is fixed to the shaft $d'$, an oscillating motion. The shaft $d'$ transmits this oscillating motion to the valve $d^{13}$ through the T-shaped piece $d^7$ and the pin $d^{11}$. As the radius from the center of the shaft $d'$ to the valve $d^{13}$, where the pin $d^{11}$ is attached, lengthens, the spring $d^{14}$ is compressed between the head $d^{12}$ and the inner abutment, and by this means the valve $d^{13}$ may be moved without much resistance and all of the time be maintained firmly upon its seat. The frictional contact between the valve and seat will always keep it clear of any accumulated deposits.

I wish to direct attention to the fact that the valve $d^{13}$ is held in its seat by means of a spring $d^{14}$, that surrounds the stud $d^{11}$, and that the internal pressure exerted against the valve $d^{13}$ is only effected at a time while the valve remains stationary, and that when the valve is to be moved in the manner described the cylinder is not subjected to the pressure of the exploded charge, and therefore the valve may be reciprocated by means of the pendent shaft $d^{11}$ with very little friction to be overcome. When the valve has been seated, then the greater the difference of pressure within the cylinder and the exterior thereof the more firmly it will be held upon its seat.

The position of the curved portion of the cam $c^{27}$ determines the time at which the valve controlling the fuel will be closed with relation to the position of the piston, a position precedent to compression.

It will be observed that the sinuosity of the groove $c^{33}$ of the cam $c^{27}$ does not continue around its entire circumference. It is evident that it is only while the sinuous portion of the groove is passing the roller $d^4$ that the arm $d$ will be vibrated, and when the arm is in that part of the groove which continues directly around the cam in an unchanged circumferential line or the straight part thereof the arm $d$ will remain unmoved and the valve $d^{13}$ will also remain in a state of rest. It will therefore be seen that a great variation in the time of movement of the valve $d^{13}$ may be effected by varying the position of the curved part of the groove in the cam $c^{27}$. This change of position of the curved part of the cam or the cam bodily, or both, for effecting the desired movement of the valve may be effectuated automatically by means of a speed-regulating device, as clearly shown in the original application, hereinbefore referred to.

Having described my invention, what I claim as new, and desire to secure by Letters Patent of the United States, is—

1. A gas-engine comprising a cylinder, a reciprocating valve within said cylinder, a chamber outside of said cylinder for containing the valve-moving mechanism, covered by said valve, a mechanism within said chamber for operating said valve, a connection within the limits of the said chamber, between said valve and said mechanism, and a means for imparting motion to said mechanism for moving the valve intermittently, substantially as set forth.

2. A gas-engine comprising a cylinder, a reciprocating valve within said cylinder, a chamber outside of said cylinder for containing the valve-moving mechanism covered by said valve, a mechanism within said chamber for operating said valve, a sinuous cam driven by said engine and adapted to impart motion to said mechanism, whereby said valve is moved intermittently, substantially as set forth.

3. A gas-engine comprising a cylinder, a reciprocating valve within said cylinder, a chamber outside of the cylinder for containing the valve-moving mechanism, covered by said valve, a mechanism within said chamber for operating said valve, a spring for holding said valve on its seat, and a means for imparting intermittent motion to said mechanism, substantially as set forth.

4. A gas-engine comprising a cylinder, a reciprocating valve within said cylinder, a chamber outside of said cylinder for containing the valve-moving mechanism, covered by said valve, a mechanism for moving said valve, within said chamber, a means for imparting motion to said mechanism whereby said valve is moved intermittently, and a conduit for admitting a lubricant into said chamber, substantially as set forth.

5. In a gas-engine a cylinder, a cylinder-head, a slide-valve within said cylinder adapted to be reciprocated across the inside face of said cylinder-head, a chamber outside of said cylinder for containing the valve-moving mechanism, covered by said valve, ports in the walls of said cylinder-head, on either side of said valve, a means within said chamber for imparting intermittent motion to said valve, whereby said ports are alternately covered by said valve, substantially as set forth.

6. In a gas-engine a cylinder, a cylinder-head, a compartment in said cylinder-head having ports into the cylinder for the passage of the fuel, an independent compartment having ports into the cylinder for the exit of gases, a third compartment covered by the valve and containing the valve-operating mechanism, mechanism for imparting intermittent motion to said valve within said compartment, and a reciprocating valve within said cylinder and adapted to cover said ports alternately, substantially as set forth.

In testimony whereof I have signed this specification, in the presence of two subscribing witnesses, this 24th day of May, A. D. 1900.

WILLIAM O. WORTH.

Witnesses:
FORÉE BAIN,
M. F. ALLEN.